(12) United States Patent
Kaspar et al.

(10) Patent No.: US 6,612,707 B2
(45) Date of Patent: Sep. 2, 2003

(54) ELECTRICALLY ADJUSTABLE EXTERIOR REAR-VIEW MIRROR

(75) Inventors: Rudolf Kaspar, Collenberg (DE); Herwig Polzer, Miltenberg (DE)

(73) Assignee: Donnelly Hohe GmbH & Co. KG (DE)

( * ) Notice: Subject to any disclaimer, the term of this patent is extended or adjusted under 35 U.S.C. 154(b) by 0 days.

(21) Appl. No.: 09/751,911

(22) Filed: Dec. 21, 2000

(65) Prior Publication Data

US 2001/0005289 A1 Jun. 28, 2001

(30) Foreign Application Priority Data

Dec. 22, 1999 (DE) .......................... 199 62 469

(51) Int. Cl.⁷ .............................. G02B 7/182; B60R 1/06
(52) U.S. Cl. ...................... 359/873; 359/874; 359/877; 248/480
(58) Field of Search ................ 359/872, 873, 359/874, 876, 877; 248/480

(56) References Cited

U.S. PATENT DOCUMENTS

| | | | | |
|---|---|---|---|---|
| 3,609,014 A | * | 9/1971 | Kurz, Jr. | |
| 3,788,734 A | * | 1/1974 | McDuffee, Sr. | |
| 3,972,597 A | * | 8/1976 | Repay et al. | |
| 4,050,776 A | * | 9/1977 | Hsu | |
| 4,105,301 A | * | 8/1978 | Doeg | |
| 4,153,342 A | * | 5/1979 | Mittelhauser | |
| 4,264,142 A | * | 4/1981 | Wunsch et al. | |
| 4,474,428 A | * | 10/1984 | Wunsch et al. | |
| 4,540,252 A | * | 9/1985 | Hayashi et al. | |
| 4,632,525 A | * | 12/1986 | Hayashi et al. | |

FOREIGN PATENT DOCUMENTS

| | | |
|---|---|---|
| DE | 28 10 888 | 9/1979 |
| DE | 29 37 961 C3 | 4/1980 |
| DE | 29 31 787 | 2/1981 |
| DE | 29 32 146 | 2/1981 |
| DE | 31 20 627 A1 | 12/1982 |
| EP | 0 340 606 A1 | 11/1989 |

* cited by examiner

Primary Examiner—Ricky D. Shafer
(74) Attorney, Agent, or Firm—McGlew and Tuttle, P.C.

(57) ABSTRACT

The invention relates to an exterior rear-view mirror comprising an adjustably held glass subassembly and at least one electrical drive motor (2), with the glass subassembly being adjustable via at least one adjustment mechanism arranged between the drive motor (2) and the glass subassembly. The adjustment mechanism comprises a drive shaft (7, 8) with an eccentrically shaped shaft section (9, 10) and a drive bar (12, 13) arranged between the glass subassembly and the eccentrically shaped shaft section (9, 10) of the drive shaft (7, 8). The drive shaft (7, 8) and the drive bar interact in such a way that a rotatory actuating movement of the drive shaft (7, 8) is converted to a linear actuating movement, acting on the glass subassembly, of the drive bar (12, 13) as a result of excursion of the eccentrically shaped shaft section (9, 10).

5 Claims, 2 Drawing Sheets

ELECTRICALLY ADJUSTABLE EXTERIOR REAR-VIEW MIRROR

FIELD OF THE INVENTION

The invention relates to an electrically adjustable exterior rear-view mirror having an adjustably held glass subassembly and one or more electrical drive motors. The glass subassembly being adjusted by at least one adjustment mechanism arranged between the drive motor(s) and the subassembly. Furthermore, the invention relates to a drive module for use in an exterior rear-view mirror, where the drive module can be fitted in the exterior rear-view mirror housing of a vehicle and with the glass subassembly of the mirror arranged on the drive module.

BACKGROUND OF THE INVENTION

The invention relates to an electrically adjustable exterior rear-view mirror according to the preamble of claim 1. Furthermore, the invention relates to a drive module for use in an exterior rear-view mirror according to the invention, with the characteristics of claim 10.

Electrically adjustable exterior rear-view mirrors are used in motor vehicle engineering in a multitude of different designs. So as to provide optimal adjustment of the angle of view to drivers, irrespective of their stature and/or seat position, generic exterior rear-view mirrors comprise an adjustably held glass subassembly which, driven by at least one electrical drive motor, and comprising an adjustment mechanism provided between the glass subassembly and the drive motor, can be adjusted by remote control. In order to make possible optimal adjustment, the glass subassembly is usually arranged so as to be adjustable in relation to two swivel axes, so that any desired angle of view can be set within a specified actuating range. In order to be able to carry out the actuating movements in respect of the two swivel axes independently of each other, as a rule two drive trains, each with a drive motor, are provided.

In the known adjustment mechanisms, the conversion of the rotatory actuating movement of the drive motor to the desired tilting motion of the glass subassembly is effected by toothed racks, threaded spindles, toothed wheel work in the connecting links, or similar components. The known adjustment mechanisms for exterior rear-view mirrors all share the feature of effecting an actuating movement between two limit stops. The limit stops determine the maximum actuating range within which the glass subassembly can be swivelled.

The known drive concepts for exterior rear-view mirrors are associated with the disadvantage of special measures having to be taken to prevent damage to the drive train when the limit stops are reached. In particular the use of sliding clutches is known which prevent damage to the adjustment mechanism by additional actuating movement of the drive motor after the limit stop has been reached. The incorporation of such sliding clutches is associated with considerable costs.

SUMMARY AND OBJECTS OF THE INVENTION

According to the invention, the adjustment mechanism used comprises a drive shaft with an eccentrically shaped shaft section and a drive bar arranged between the glass subassembly and the eccentrically shaped shaft section of the drive shaft. The drive shaft and the drive bar interact in such a way that a rotatory actuating movement of the drive shaft is converted to a linear actuating movement of the drive bar as a result of excursion of the eccentrically shaped shaft section. By means of the linear actuating movement of the drive bar, the desired tilting motion of the glass subassembly can be effected. Depending on the design of the eccentric shaft section, a lower and an upper dead centre result for the linear actuating movement of the drive bar. The limits of the actuating range within which the glass subassembly can be adjusted is determined by this upper and lower dead centre. If the glass subassembly is adjusted by remotely-controlled drive of the drive motor and if the glass subassembly reaches a limit of the swivelling range by moving to one of the dead centres, any additional actuating movement of the drive motor does not cause any driving against a limit stop, but instead merely the overshooting of the dead centre. Following overshooting of the dead centre, the tilting motion of the glass subassembly is continued in the opposite direction of travel.

Such a design of the adjustment mechanism has the effect that with permanent drive of the drive motor in one direction of rotation, the entire actuating range in an adjustment plane, within which the glass subassembly can be swivelled, is continuously cycled. A 360° rotation of the drive shaft causes the entire actuating range to be cycled-through twice. There is no mechanical limit of the actuating range; consequently there is no need to incorporate any safety measures such as for example sliding clutches.

One option in designing the adjustment mechanism is to configure the drive shaft in the manner of a crankshaft with a driving crank provided at the driven side of said crankshaft. One end of the drive bar is rotatably held at the driving crank. In this arrangements the upper and the lower dead centres result from the driving crank being in line with the drive bar.

As an alternative, it is also imaginable to shape the drive shaft in the manner of a camshaft, with at least one actuating cam being arranged on the driven side of said camshaft. One end of the drive bar can be made to rest against said actuating cam and is pushed against it by means of a pretension device. When the drive shaft is driven, the actuating cam pushes the drive bar further and further outwards, depending on the relative position between the actuating cam and the drive bar, until the highest point of the actuating cam is reached. If the rotation of the drive shaft is continued in the same direction, the drive shaft moves past the upper dead centre of the drive bar which is subsequently pushed inwards again by the pretension device.

Since in the exterior rear-view mirrors according to the invention the entire actuating range can be continuously cycled, it is adequate in many applications if the drive motor for adjusting the glass subassembly is driven only in one direction of rotation.

A further option for cost saving can be realised if the exterior rear-view mirror comprises two adjustment mechanisms via which the glass subassembly can be adjusted in relation to two different swivel axes while comprising only one drive motor. In this case both adjustment mechanisms must be able to be driven by the drive motor so as to allow actuating movements of the glass subassembly in relation to both swivel axes. It is for example imaginable that, depending on the desired movement, the drive motor can be adjusted between two positions in relation to a swivel axis, so that in the first position it drives the first adjustment mechanism and in the second position it drives the second adjustment mechanism.

With the use of the drive concept according to the invention, where the adjustment mechanisms need to be driven only in one direction, thus cycling through the entire actuating range, it is possible to minimise mechanical expenditure by only using one drive motor for both adjustment mechanisms, for example a magnet switch to switch the drive motor between the two adjustment mechanisms. This requires the use of a drive motor which can be driven in both directions of rotation, with a power takeoff mechanism being provided between the drive motor and the two adjustment mechanisms In the one direction of rotation of the drive motor said power takeoff mechanism essentially transfers the actuating movement exclusively to the first adjustment mechanism, and in the opposite direction of rotation of the drive motor it essentially transfers the actuating movement exclusively to the second adjustment mechanism. Thus, by means of the power takeoff mechanism, one direction of rotation of the drive motor is associated with one adjustment mechanism, so that by reversing the direction of rotation of the drive motor, selection of the respective adjustment mechanism and thus selection of the desired tilting motion in relation to one of the swivel axes become possible. Suitable power takeoff mechanisms can for example be realised by using one-sided action free-wheel devices which permit an actuating movement to be tranferred only in one direction of rotation.

A particularly simple arrangement, from a mechanical point of view, results if the power takeoff mechanism comprises a drive wheel drivable by the drive motor, with said drive wheel being able to be engaged in a non-positive way by means of two friction wheels arranged on the drive shafts of the adjustment mechanisms. The axis of rotation of the drive wheel and the axes of rotation of the two drive shafts must essentially be aligned parallel to each other. In order to ensure that the actuating movement of the drive motor, depending on its direction of rotation, is essentially only transferred to one of the drive shafts, the drive shafts, in the region of the friction wheels, must be held in elongated holes. Together, the elongated holes must form an incomplete V-shaped arrangement which makes it possible for the axis spacing between the axis of rotation of the drive wheel and the drive shafts in the area of the friction wheels to be variable. When the drive wheel is then driven by the drive motor, tangentially directed friction forces act upon both friction wheels, said friction forces being transferred in the contact surface between the friction wheels and the drive wheel. Because the friction wheels are contacting the drive wheel on opposite sides of the drive wheel, the frictional forces act in opposite directions on the two friction wheels. Consequently, the drive shafts are pushed in opposite directions as a result of friction forces acting on the friction wheels. This results in one drive shaft in the inclined elongated hole being pushed radially in the direction of the drive wheel. By contrast, due to the V-shaped arrangement of the elongated holes, the other drive shaft is pushed radially outwards. As a result of the movement of the drive shafts in the elongated holes, the axis spacing between the drive shafts and the axis of rotation of the drive wheel changes, at least to a small extent. Consequently one axis spacing increases while the other axis spacing decreases. By reducing the axis spacing at one drive shaft, the friction on the associated friction wheel increases, thus making possible non-positive transmission of the actuating movement of the drive wheel onto this friction wheel. The opposite friction wheel increases the axis spacing, thus remaining non-operative because the frictional forces transferred from the drive wheel to the friction wheel are not sufficient to overcome the existing friction resistance.

The dihedral angle $\alpha$ of the V-shaped arrangement of the elongated holes should preferably be between 20° and 40°. In other words, the elongated holes should preferably be arranged at an angle $\alpha/2$ of approx. 10° to 20° to vertical, with the reference vertical being determined by a plumb bob in relation to the connecting line of the axes of rotation. Of course other dihedral angles $\alpha$ are also imaginable.

So as to enhance silent operation of the power takeoff mechanism while keeping wear and tear relatively low, it is advantageous if the running faces of the drive wheel and/or of the friction wheels are made from an elastic material, for example rubber. For example, an elastomer running face can be sprayed onto a base made of plastic.

From the state of the art, drive modules for electrical exterior rear-view mirrors are known which are completely preassembled and which can be fitted in the exterior rear-view mirror as a unit. The glass subassembly is then finally attached to an electrically adjustable retention plate of the drive module. Such preassembled drive modules can also be provided for use in exterior rear-view mirrors according to the invention, comprising only one drive motor for selecting two separate adjustment mechanisms while using one power takeoff mechanism.

BRIEF DESCRIPTION OF THE DRAWINGS

Below, the invention is explained in more detail by means of drawings showing only preferred embodiments, as follows.

DESCRIPTION OF THE PREFERRED EMBODIMENT

Figure 1:
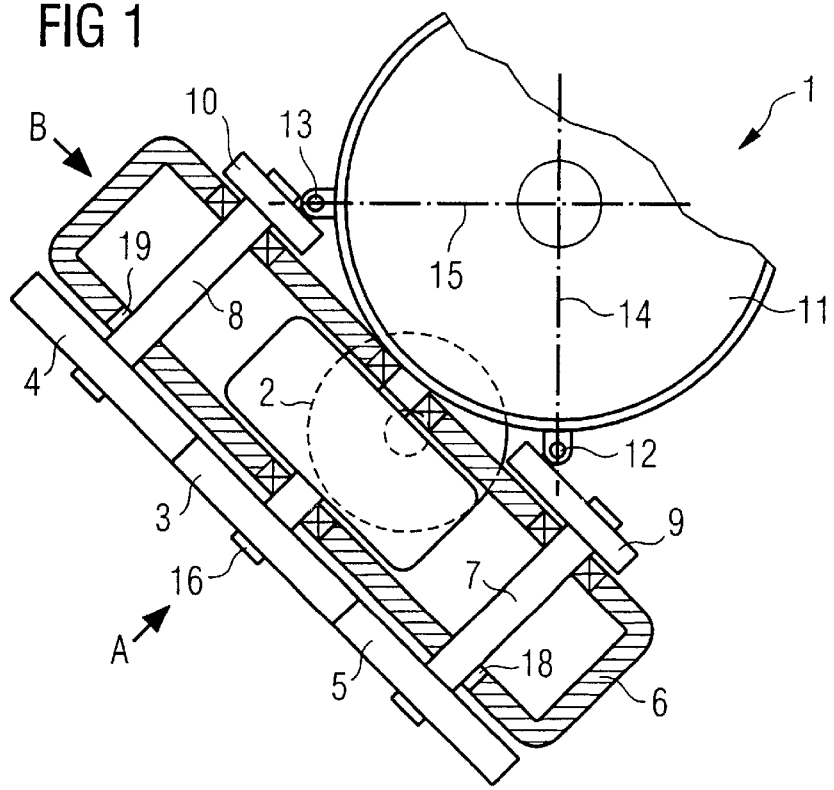
FIG. 1 is a diagrammatic top view of a drive module.

FIG. 1 is a top view of a drive module 1 for use in an electrically adjustable exterior rear-view mirror. For increased clarity only those components required to understand the invention are shown in the drawing. The drive module 1 comprises a drive motor 2, a drive wheel 3, two friction wheels 4 and 5, a frame 6, two crankshafts 7 and 8, serving as drive shafts, with associated driving cranks 9 and 10, and an adjustably held retention plate 11 to which the glass subassembly can be attached. Each of the driving cranks 9 and 10 is coupled to the retention plate 11 via a drive bar 12 and 13.

The retention plate 11 is swivellably held on the swivel axes 14 and 15. The components required for this are not shown in the drawing. Rotation of the drive shaft 8 by a particular angle causes an excursion of the driving crank 10, so that the drive bar 13 is moved perpendicularly to the image plane, thus causing a swivelling movement of the retention plate 11 around the swivel axis 14. Analogous to this, a swivelling movement of the retention plate 11 around the swivel axis 15 can be caused by rotation of the drive axis 7 and the associated adjustment of the driving crank 9 and the drive bar 12. In this, the actuating movement of the drive axes 8 and 7 is not limited by limit stops, but instead the actuating range of the retention plate 11 can be continuously cycled by continually driving the drive shafts 7 or 8. The actuating movement of the drive shafts 7 and 8 is caused by driving the drive motor 2 which drives the drive wheel 3 via a shaft 16. The drive wheel 3 in turn can transfer frictional forces to the friction wheels 4 and 5 so as to drive the drive shafts 7 and 8. In the region of the friction wheels 4 and 5, the drive shafts 7 and 8 are held in elongated holes 18 and 19 shown in sectional view, so that the friction wheels 4 or 5, depending on the direction of rotation of the drive wheel 3, can deflect outwards. Consequently, depending on the direction of rotation of the drive wheel 3, in each instance only one of the drive shafts 7 or 8 is driven.

Figure 2:
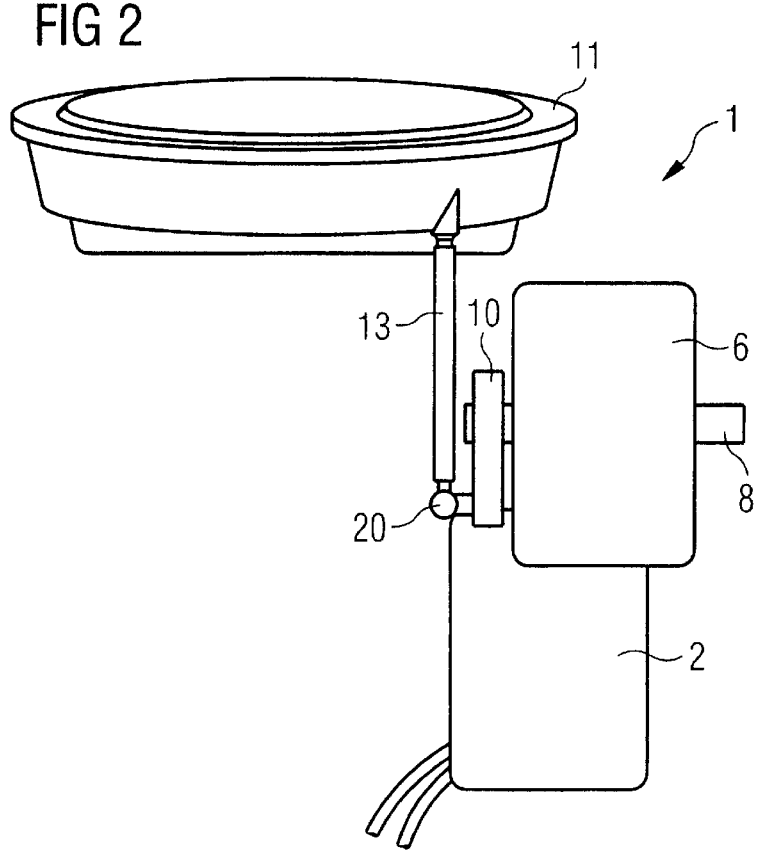
FIG. 2 is a first lateral view of the drive module according to FIG. 1.

FIG. 2 is a lateral view B of the drive module 1. The retention plate 11 is shown in perspective view; a glass subassembly can be attached to the top of said retention plate. Shown in addition are the drive motor 2, the frame 6, the drive shaft 8, the driving crank 10 and the drive bar 13. The friction wheel 4 is not shown in FIG. 2. In the diagram, the driving crank 10 is in the lower dead centre, so that the drive bar 13 is at the lowest point and the retention plate 11 correspondingly is at its maximum lateral tilt. The drive bar 13 is connected to the driving crank 10 by means of a ball-and-socket joint 20, so that the upper and lower dead centres of the driving crank 10 can be overshot. The way the drive bar 13 is held in the retention plate 11 allows slight pendulum movement of the drive bar 13 because during rotation of the driving crank 10, said drive bar also describes an excursion from the vertical.

Figure 3:
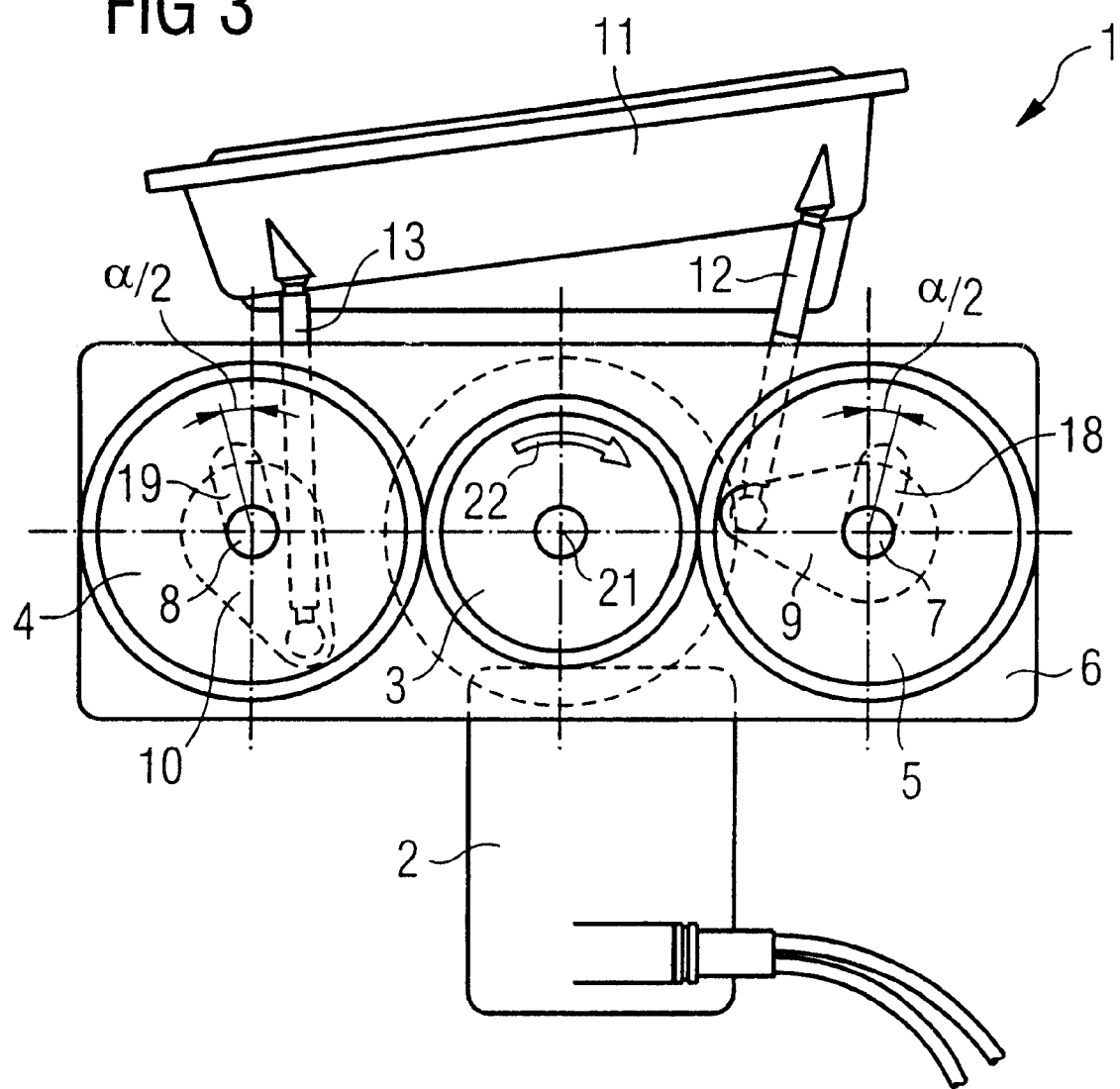
FIG. 3 is a second lateral view of the drive module according to FIG. 1.

FIG. 3 is a lateral view B of the drive module 1. The elongated holes 18 and 19 extend diagonally downwards at a dihedral angle $\alpha/2$ to vertical, resulting in a total dihedral angle $\alpha$ of the V-shaped arrangement formed by the elongated holes 18 and 19. In the non-operative position shown, the drive wheel 3 is in equal contact with the two friction wheels 4 and 5. In other words, the axis spacing between the axis of rotation 21 of the shaft 16 and the axes of rotation of the drive shafts 7 and 8 is exactly the same. When the drive wheel 3 is then driven in the direction of the arrow 22, the friction wheel 5 is pressed downwards by the frictional force directed tangentially downwards in the contact surface, so that the drive shaft 7 comes to rest against the lower end of the elongated hole 18. With the resulting spacing between the axis of rotation 21 of the shaft 16 and the drive shaft 7, frictional forces between the drive wheel 3 and the friction wheel 5 can be transferred, which are sufficient to drive the drive bar 12.

By contrast, when the drive wheel 3 rotates in the direction of the arrow 22, the friction wheel 4 is pushed upwards diagonally upwards in the elongated hole 19, resulting in an increase in the axis spacing between the drive shaft 8 and the rotary shaft 21 of the shaft 16. As a result of this increased axis spacing, the frictional force in the contact surface between the drive wheel 3 and the friction wheel 4 decreases, so that no actuating movement can be transferred to the drive bar 13 as a result.

Conversely, when the drive wheel 3 rotates in the direction opposite to the arrow 22, the drive bar 13 is driven, while in this case the drive bar 12 is not driven. The diagonal arrangement of the two elongated holes 18 and 19, which together describe an incomplete V-shaped arrangement, results in only one of the friction wheels 4 or 5 being driven, depending on the direction of rotation of the drive wheel 3.

What is claimed is:

1. An exterior rear-view mirror comprising:
   an adjustably held glass subassembly;
   an electrical drive motor;
   an adjustment mechanism arranged between said drive motor and said glass subassembly, said glass subassembly being adjustable via said adjustment mechanism, said adjustment mechanism comprising a drive shaft with an eccentrically shaped shaft section and a drive bar acting on said glass subassembly, said drive bar being arranged between said glass subassembly and said eccentrically shaped shaft section of said drive shaft, said drive shaft and said drive bar interacting to convert rotatory actuating movement of said drive shaft to a linear actuating movement of said drive bar as a result of movement of said eccentrically shaped shaft section;

another adjustment mechanism arranged between said drive motor and said glass subassembly, said glass subassembly being adjustable via said another adjustment mechanism, said another adjustment mechanism comprising another drive shaft with an eccentrically shaped shaft section and another drive bar acting on said glass subassembly, said another drive bar being arranged between said glass subassembly and said eccentrically shaped shaft section of said another drive shaft, said another drive shaft and said another drive bar interacting to convert rotatory actuating movement of said another drive shaft to a linear actuating movement of said another drive bar as a result of movement of said eccentrically shaped shaft section of said another drive shaft, said adjustment mechanism adjusting said subassembly about one of two different swivel axes and said another adjustment mechanism adjusting said subassembly about another of two different swivel axes, said motor being a single drive unit driving each of said adjustment mechanism and said another adjustment mechanism; and a power takeoff mechanism arranged between said drive motor and said adjustment mechanism and said another adjustment mechanism, said power takeoff mechanism being configured such that, in one direction of rotation of said drive motor said actuating movement is essentially transferred exclusively to said adjustment mechanism, and in said opposite direction of rotation of said drive motor said actuating movement is essentially transferred exclusively to said another adjustment mechanism, wherein said power takeoff mechanism comprises a drive wheel having a shaft drivable by said drive motor, said drive wheel being engaged in a non-positive way via two friction wheels arranged on said drive shafts of said adjustment mechanisms, with said shaft of said drive wheel and said axes of rotation of said two drive shafts essentially being aligned parallel to each other, and with said drive shafts in a region of said friction wheels, held in diagonally arranged elongated holes, wherein said holes together form an incomplete V-shaped arrangement, whereby it possible for axis spacing between said shaft of said drive wheel and said drive shafts in the area of said friction wheels to be variable.

2. The exterior rear-view mirror according to claim 1, wherein said drive shaft has a crankshaft portion with a driving crank provided at a driven side of said crankshaft, said drive bar being rotatably engaged at said driving crank.

3. The exterior rear-view mirror according to claim 1, wherein said drive motor is rotationally unidirectional in operation.

4. The exterior rear-view mirror according to claim 1, wherein a dihedral angle of said V-shaped arrangement of said elongated holes is between 20° and 40°.

5. The exterior rear-view mirror according to claim 1, wherein running faces of at least one of said drive wheels and said friction wheels are made from an elastic material.

* * * * *